July 22, 1969  J. D. RUTZEBECK  3,456,697
TRAVELING ARBOR SAW
Filed Sept. 11, 1967  6 Sheets-Sheet 1
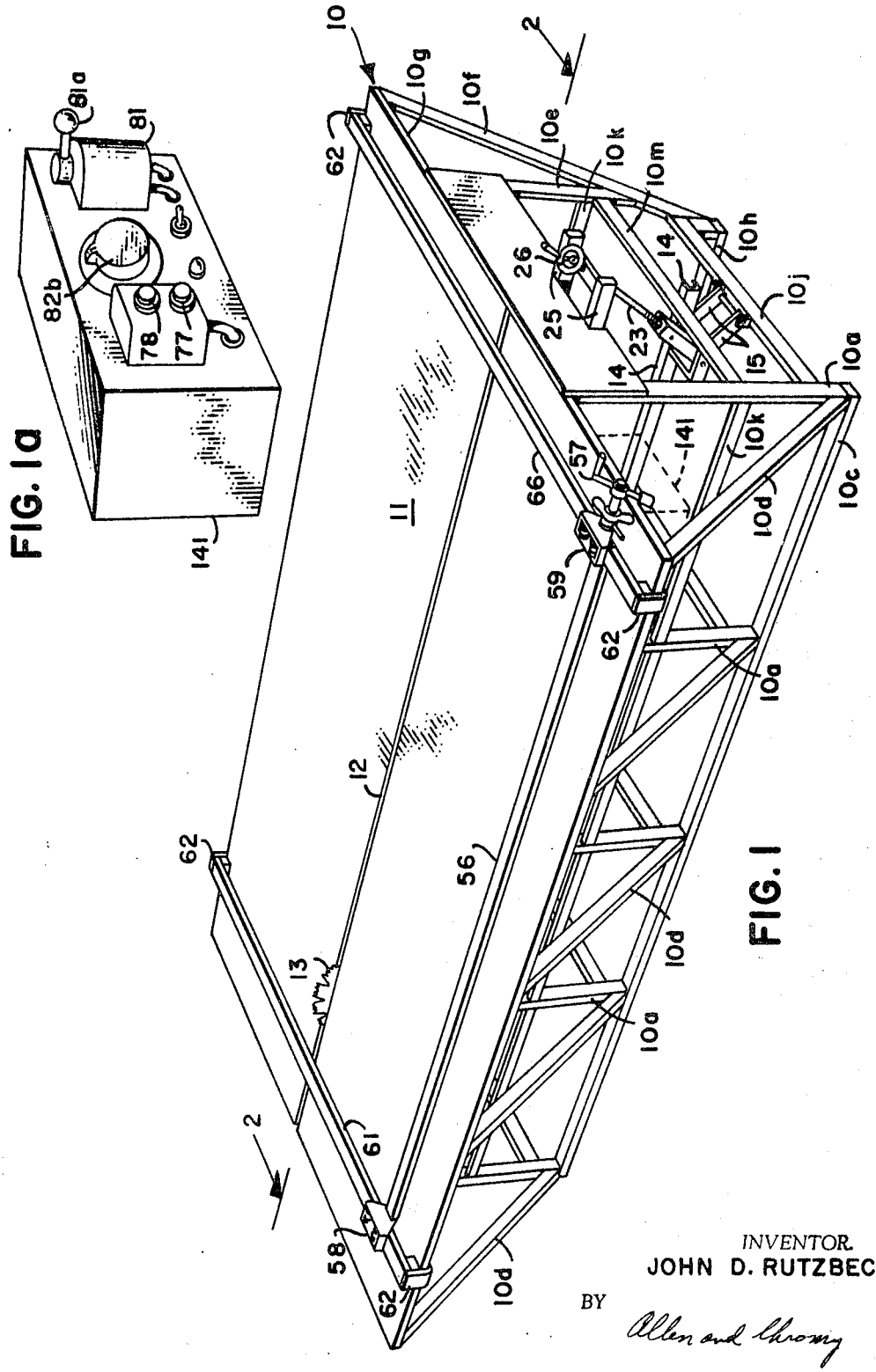
INVENTOR.
JOHN D. RUTZBECK
BY
Allen and Chromy
ATTORNEYS

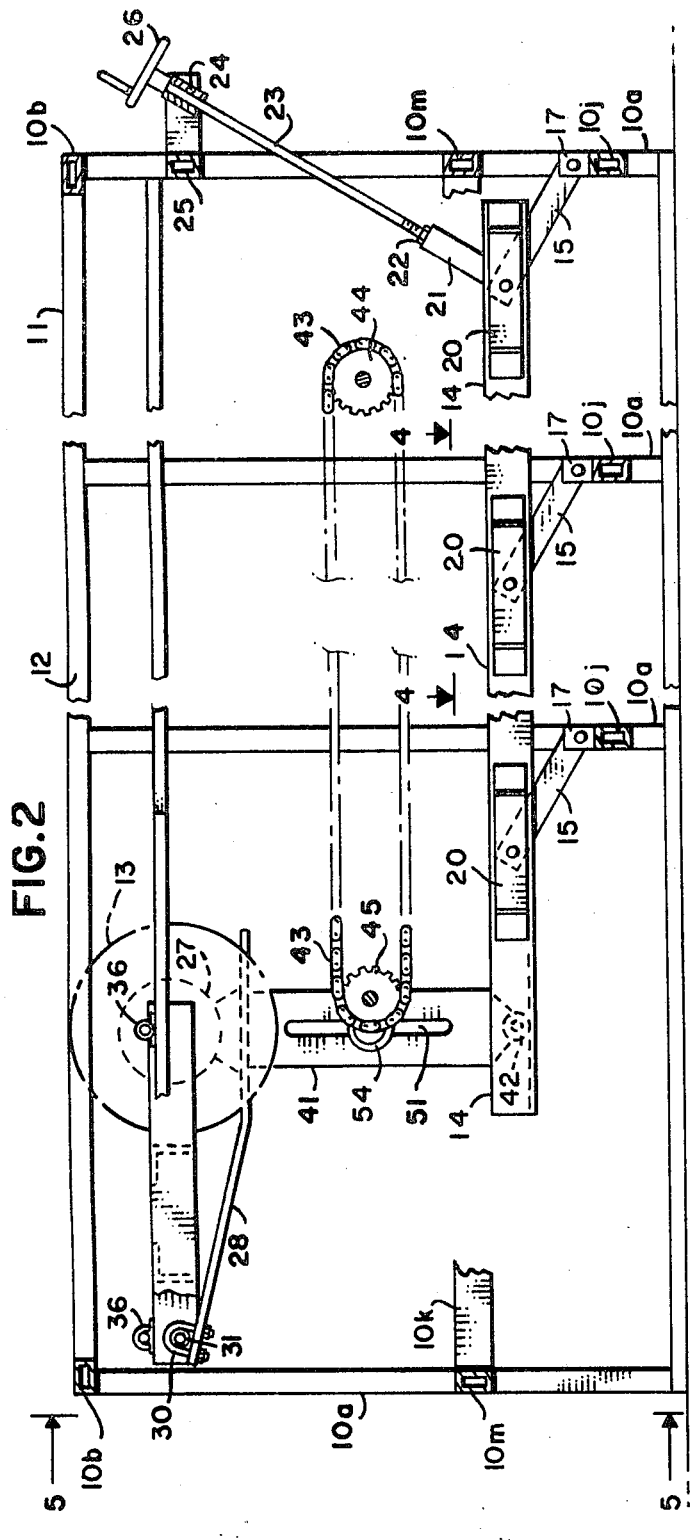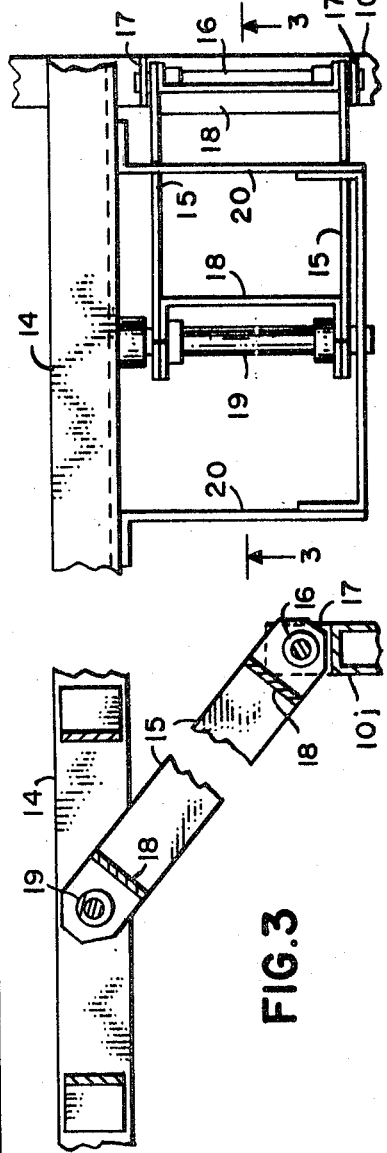

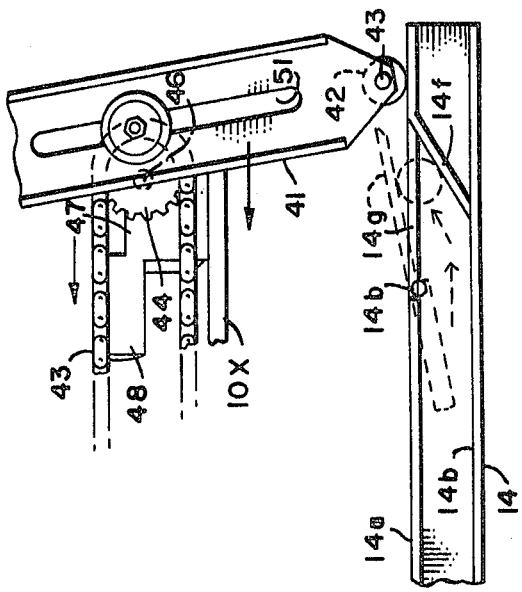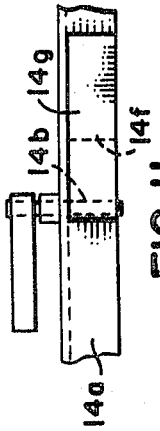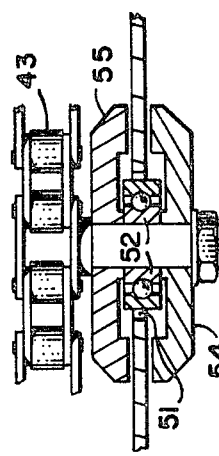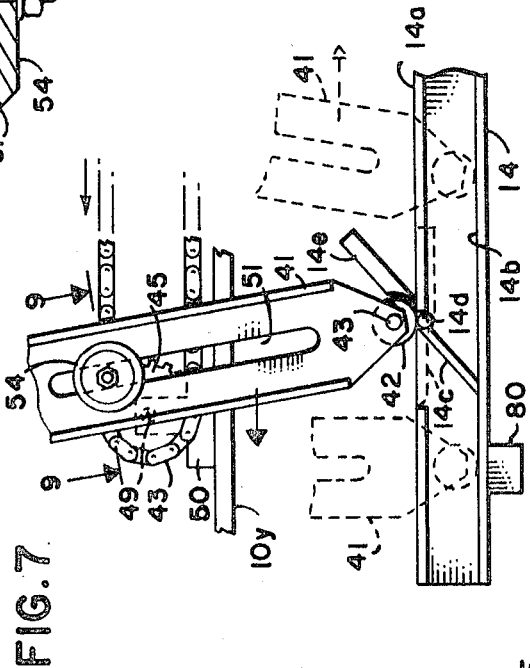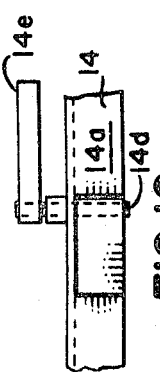

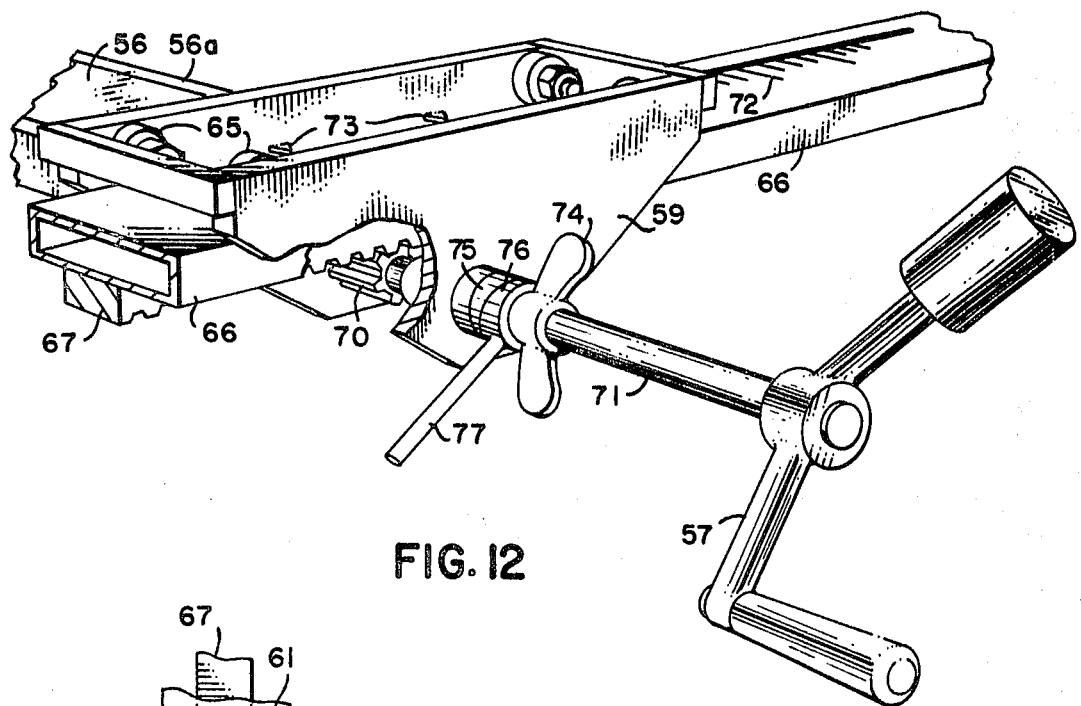

United States Patent Office 3,456,697
Patented July 22, 1969

3,456,697
TRAVELING ARBOR SAW
John D. Rutzebeck, P.O. Box 30, Hayward, Calif. 94543
Filed Sept. 11, 1967, Ser. No. 666,640
Int. Cl. B27b 5/18
U.S. Cl. 143—47                8 Claims

ABSTRACT OF THE DISCLOSURE

A traveling arbor saw provided with a motor driven circular saw supported on a carriage under the saw table. The carriage is provided with a platform for the saw motor. The platform is provided with a post having a roller at the lower end thereof adapted to ride on an upper surface of a channel when the saw is raised for sawing operation and on a lower surface of the channel-shaped rail when the saw is returned. The saw carriage is moved by a motor-actuated chain, both during its cutting stroke and during the return stroke. Saw blade height adjustment is provided by raising or lowering the rail. An electric circuit energizes the electric motors and also controls the motors to provide automatic cycling of the apparatus.

DESCRIPTION OF THE INVENTION

This invention relates to a traveling arbor saw in general. More particularly, this invention relates to a traveling arbor saw that is provided with an automatically controlled cycling mechanism.

An object of this invention is to provide an improved traveling arbor saw with automatically actuated cycling mechanism that is efficient in operation and economical to manufacture.

Another object of this invention is to provide an improved traveling arbor saw with automatically actuated cycling mechanism having a limit switch which is opened at the end of the saw cut.

Another object of this invention is to provide an improved traveling arbor saw having an electric motor for driving a traverse mechanism, which is reversible, by a chain attached appurtenance moving in a carriage support slot which accomplishes its purpose while the chain is driven in one direction.

Still another object of this invention is to provide an improved traveling arbor saw provided with an improved adjustable fence which is attached to the table of the arbor saw and is readily removable therefrom, said arbor saw also being provided with a rail having a top surface which is engaged by the support of the arbor saw carriage during the saw cut, said rail also having a lower surface which is engaged by said support during the return of the saw carriage to its starting position, said rail being supported by a linkage which permits the raising or lowering thereof to raise or lower the saw blade with respect to the table surface.

Other and further objects of this invention will be apparent to those skilled in the art to which it relates from the following specification, claims and drawing in which briefly:

FIG. 1 is a perspective view of an embodiment of this traveling arbor saw showing the saw blade at the end of the saw cut;

FIG. 1a is a perspective view of the control box employed in this apparatus;

FIG. 2 is a sectional view, partially broken away, taken along the line 2—2 of FIG. 1;

FIG. 3 is a detail view of one of the links supporting the rail which is employed for supporting one end of the tiltable saw platform of the saw carriage;

FIG. 4 is a sectional view taken along the line 4—4 of FIG. 2 and is a plan view of one of the rail supporting links;

FIG. 7 is a partial view of the upright member employed for supporting one end of the tiltable saw platform of the saw carriage and shows this member about to descend from the upper surface of the rail to the lower surface thereof on which the bottom part of the member is shown in broken outline in two positions on opposite sides of the pivoted incline provided between said surfaces;

FIG. 8 is a view showing a portion of the upright member, as illustrated in FIG. 7, in position at the end of the return stroke in which the aforesaid upright member is returned to the upper surface of the rail in position for another saw cut;

FIG. 9 is a sectional view taken along the line 9—9 of FIG. 7 showing the upright member provided with means attaching it to the traverse chain;

FIG. 10 is a partial plan view of the rail showing the pivotally mounted incline illustrated in FIG. 7;

FIG. 11 is a plan view of a portion of the rail showing the pivotally mounted incline cover illustrated in FIG. 8;

FIG. 12 is a perspective view partially broken away showing a portion of the fence adjusting mechanism;

FIG. 13 is a top view of one end of the fence showing the supporting carriage therefor;

FIG. 14 is a detail view showing one of the clamps for attaching the fence to the saw table.

Figure 5:
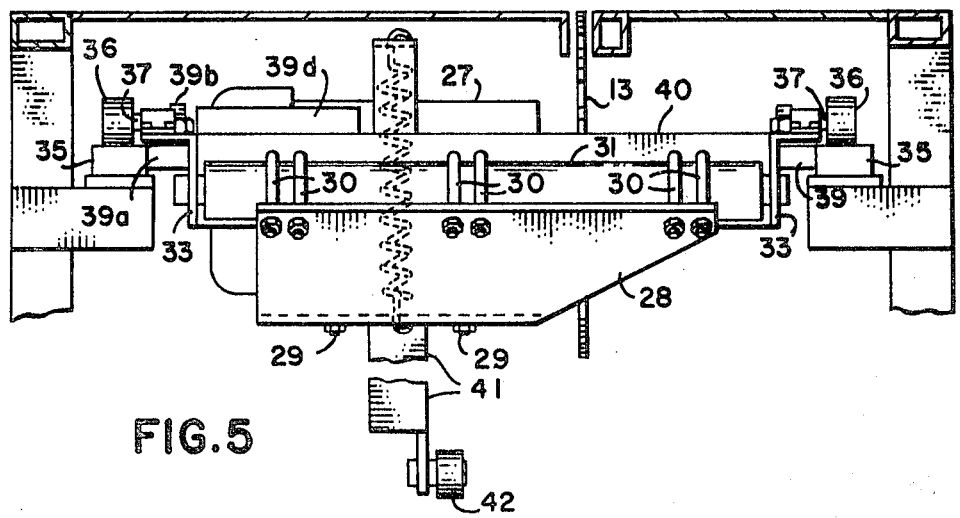
FIG. 5 is an end view, partially broken away, of the traveling arbor saw taken from the front end thereof.

Referring to the drawing in detail, reference numeral 10 designates the frame of this traveling arbor saw. This frame is provided with a table 11 having a longitudinally extending slot 12 through which the circular saw blade 13 is adapted to be moved during the sawing of a board or panel positioned on the top of the table 11. One side of the frame 10 is provided with a plurality of substantially vertical leg members 10a, the tops of which are attached to the horizontal top members 10b and the bottoms of which are attached to the longitudinally extending member 10c. A plurality of angularly disposed members 10d, the bottoms of which are attached to the longitudinally extending member 10c and the tops of which are attached to the horizontal members 10b at the outer extremities thereof. The members 10a, 10b, 10c and 10d form one side of the frame 10.

Vertical members 10e, the bottoms of which are attached to the angularly disposed members 10f and the tops of which are attached to the horizontal members 10g are provided to the other side of the frame 10. The tops of the angularly disposed members 10f are attached to the outer ends of the horizontal members 10g and the bottoms of these angularly disposed members are attached to the longitudinally disposed horizontal member 10h.

Horizontal cross pieces 10i are provided between the vertical members 10a and the angularly disposed members 10f, and the rail 14 is adjustably supported on these cross members 10j by the links 15. A rectangular auxiliary frame made of longitudinally extending members 10k and end cross members 10m is also provided to the main frame 10.

A pair of links 15 is positioned at each cross piece 10j and the bottoms of these links are pivotally attached to a cross piece 10j by shaft 16 and bracket 17, as shown in FIGS. 3 and 4. Suitable brackets 18 may be provided between the links 15 of each pair of links and welded or otherwise attached thereto. Shafts 19 are rotatably supported at the upper ends of the links 15. One end of each shaft is attached to the rail 14 by welding or the like. The other end of each shaft 19 is attached to a box-shaped bracket 20 which is also attached to the rail 14 by welding or the like.

The shaft 19 near the rear end of the rail 14 is provided with a U-shaped member 21 which is pivotally attached thereto and which is provided with a nut 22 that is welded thereto. Nut 22 is adapted to receive the threaded lower end of the rod 23. The upper end portion of the rod 23 is rotatably supported in the bearing 24. Bearing 24 is supported by a suitable bracket which is attached to the cross member 25 of the frame. A hand wheel 26 is fixedly attached to the upper end of the rod 23. Thus, by turning the hand wheel 26 and rod 23, the vertical position of the rail 14 may be adjusted.

Figure 6:
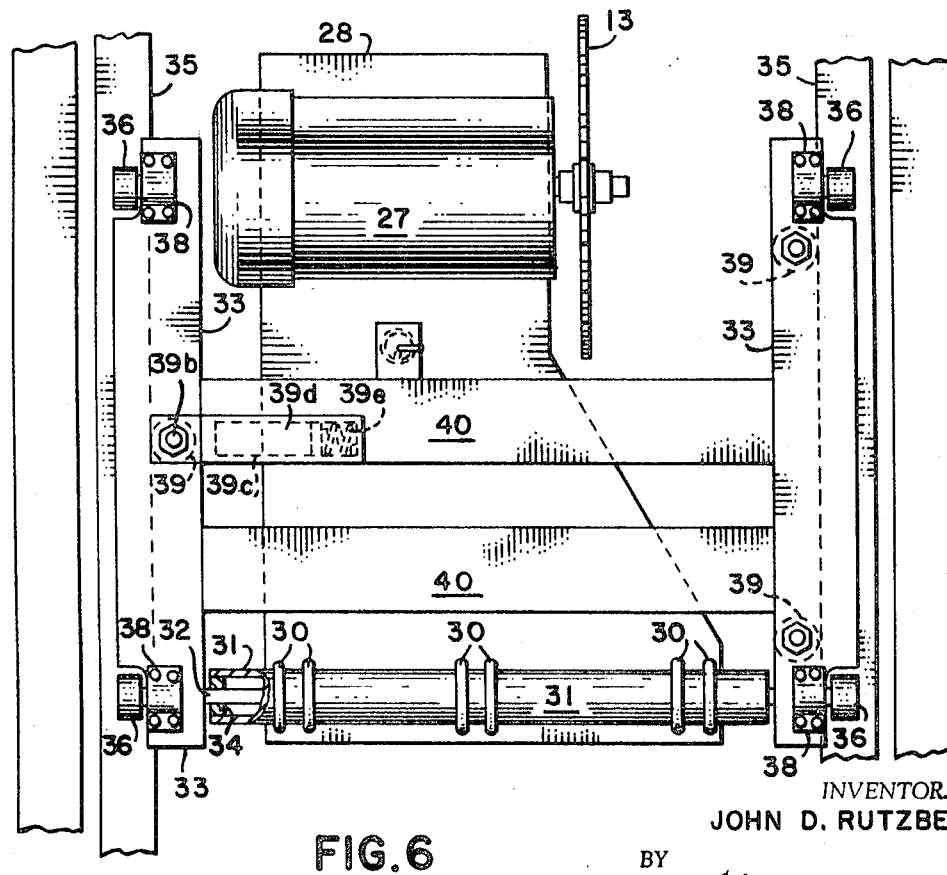
FIG. 6 is a plan view of the saw carriage.

The circular saw blade 13 is attached to the shaft of the motor 27 which is attached to the tiltable platform 28 by bolts 29 near one end thereof. The other end of the platform 28 is attached by U-shaped members 30 to the pipe 31 which is rotatably supported on the rod 32 of the carriage 33 by bearings 34, as shown in FIGS. 5 and 6. The side members 33 of the saw carriage are supported on the rails 35 by rollers 36 which are attached to the side members 33 of the carriage of short shafts 37 and brackets 38. Additional rollers 39, which are supported on the side members 33 of the carriage by suitable shafts, are provided thereto for engaging the inner side surfaces of the rails 35 to guide the saw carriage and prevent sidewise motion thereof with respect to the rails.

Two rollers 39 are provided on one side of the saw carriage near the ends of one of the side members to which they are rotatably attached. The other side of the saw carriage is provided with one roller 39a which is rotatably attached to the side of the saw carriage substantially in the center thereof. Roller 39a is rotatably positioned on the shaft 39b. Shaft 39b is attached to the member 39c which is slidably positioned in the socket 39d and which engages one end of the spring 39e that is positioned inside of the socket. The other end of the spring 39e engages the inside of the socket and the spring 39e functions to press the member 39c outward so that roller 39a is pressed against the side of the rail 35. The pressure of spring 39e is sufficient to maintain the rollers 39 and 39a in firm engagement with rails 35.

Suitable cross members 40 are welded to the side members of the carriage to provide sufficient strength thereto. The tiltable platform 28 of the saw carriage is provided with a downwardly extending member 41 which is attached thereto by welding or the like, and this downwardly extending member is positioned under the saw motor, as shown in FIG. 2.

The bottom end of the upright member 41 is provided with a roller 42 which is rotatably supported thereon by a short shaft 43, as shown in FIGS. 2, 7 and 8. During the sawing stroke, roller 42 is adapted to engage the upper surface 14a of the rail 14 so that the saw blade 13 is raised above the table 11. When the saw is to be returned to its starting position, the saw blade is lowered below the table top. During the return stroke roller 42 is dropped to the lower surface 14b by the inclined member 14c which is pivotally attached to the rear end portion of the rail 14 by the pivot 14d, as shown in FIG. 7. This pivot is provided with a weight 14e which functions to hold the member 14c in the horizontal position until the roller 42 is moved thereon and the weight of the motor and motor platform moves member 14c to its inclined position, thereby lowering the roller 42 to surface 14b. After roller 42 is on the lower surface 14b, the inclined member 14c is elevated to its normal position by weight 14e. The roller 42 is moved a short distance to the left on surface 14b and opens limit switch 80 which is attached to the bottom of rail 14. Roller 42 is then moved to the right on the lower surface 14b by reversing motor 48 with reversing switch 81 during the return stroke of the saw, as will be described hereinafter. Rail 14 is provided with a fixed inclined surface 14f connecting lower surface 14b to the upper surface 14a near the rear end of this rail. Thus, when the saw carriage is being returned to its starting position, the roller 42 moves up inclined surface 14f, thereby proceeding from surface 14b to surface 14a, and during this motion roller 42 lifts the pivoted section 14g of the rail out of the way so that the roller may proceed to the upper surface 14a. Pivoted section 14g is attached by pivot 14h to the rail 14 and this pivot is provided with a suitable weight which normally keeps it in its horizontal position, in which position the upper surface thereof is in the plane of surface 14a.

The saw carriage is moved on rails 35 and channel-shaped rail 14 by chain 43 which is supported on the frame 10 by sprockets 44 and 45. Sprocket 44 is fixedly attached to the shaft 46 which is provided to the reduction gearing positioned in housing 47. This gearing is driven by the motor 48 and the reduction gearing and motor are mounted by suitable bolts on the frame cross member 10x, as shown in FIG. 8. Sprocket 45 is fixedly attached to the shaft 49 which is supported by suitable supporting members 50 on the frame cross piece 10y shown in FIG. 7. Upright member 41, which is attached to the bottom of the saw platform 28, is provided with a long slot 51 for slidably receiving the ball bearing assembly 52 which is rotatably positioned on the short shaft 53, as shown in FIG. 9. Shaft 53 is attached to one of the links of the chain 43 so that as this chain is moved over sprocket wheels 44 and 45, this shaft is carried thereby through a predetermined orbit and the saw carriage is moved back and forth.

The inner race of the ball bearing 52 is clamped between washers 54 and 55 which are wider than the slot 51 and thus extend over both sides of the upright member 41 which is held loosely therebetween. Thus, washers 54 and 55 hold the ball bearing assembly 52 in the slot 51 so that the outer race of this assembly engages the sides of the slot loosely. When the motor 48 is energized it drives sprocket 44 and chain 43 is actuated to move the short shaft 53 and the ball bearing assembly 52 therewith. The outer race of the ball bearing assembly 52 engages the slot 51 and, as a result, the saw carriage is moved on rails 35 and 14. At the same time, the saw blade is moved in the slot in the table 11.

This apparatus is also provided with a fence 56 which is adapted to be positioned on the top of the table and which is adjustable by means of the hand crank 57. The ends of the fence 56, shown in FIG. 1, are attached to carriages 58 and 59, respectively. Carriage 58, shown in FIG. 13, is provided with four rollers 60 which are rotatably attached thereto by suitable shafts for movably supporting the carriage on the cross member 61, which may be a rectangular tube. Cross member 61 is provided with attaching brackets at each end thereof, such as the bracket 62, shown in FIG. 14, which is provided with clamping bolts 63 and 64. These clamping bolts are adapted to engage surfaces of the side members 10c and 10i of the saw table frame. Carriage 59 is likewise provided with four rollers 65 which are rotatably attached thereto by short shafts, and these rollers engage the top surface of the cross member 66, which may be a rectangular tube. The ends of cross member 66 are also attached to the saw frame members 10c and 10i by clamps such as the clamping bracket 62 so that the cross member 66 is supported well above the top of the saw table. Cross members 61 and 66 are positioned at opposite ends of the table and parallel to each other. Racks 67 and 68, which are adapted to be engaged by the pinion gears 69 and 70, respectively, are attached by welding or the like to the bottom surfaces of the cross members 61 and 66, respectively. Pinion gears 69 and 70 are fixedly attached to the shaft 71 which is supported in bearings provided to the carriages 58 and 59. Shaft 71 is provided with the hand lever 57 so that this shaft may be rotated thereby and the position of the fence 56 adjusted on the top of the saw table.

A suitable scale 72 is positioned on the top of cross member 66 so that the fence 56 may be accurately positioned on the saw table by reading the scale at pointers 73 which are provided to carriage 59 adjacent to the scale 72 to cooperate therewith in reading the position of the fence on the table.

The fence 56 may be made of three members 56a, 56b and 56c which are welded together to provide a relatively rigid channel member and the side 56a may extend down almost to the top of the saw table so that it is adapted to engage a side of the board positioned on the saw table for lining this board up with respect to the saw blade and the slot through which the saw blade is adapted to protrude upward. The fence is provided with a clamp for holding it in a predetermined position. This clamp includes a nut 74 which is threaded to rod 71 and engages one side of the cam 76. The inclined surface of cam 76 engages the inclined surface of cam 75 which is fixedly attached to carriage 59. Cam 76 is adapted to be rotated by lever 77 to lock the fence in a predetermined position by clamping rod 71 against rotation.

Figure 15:
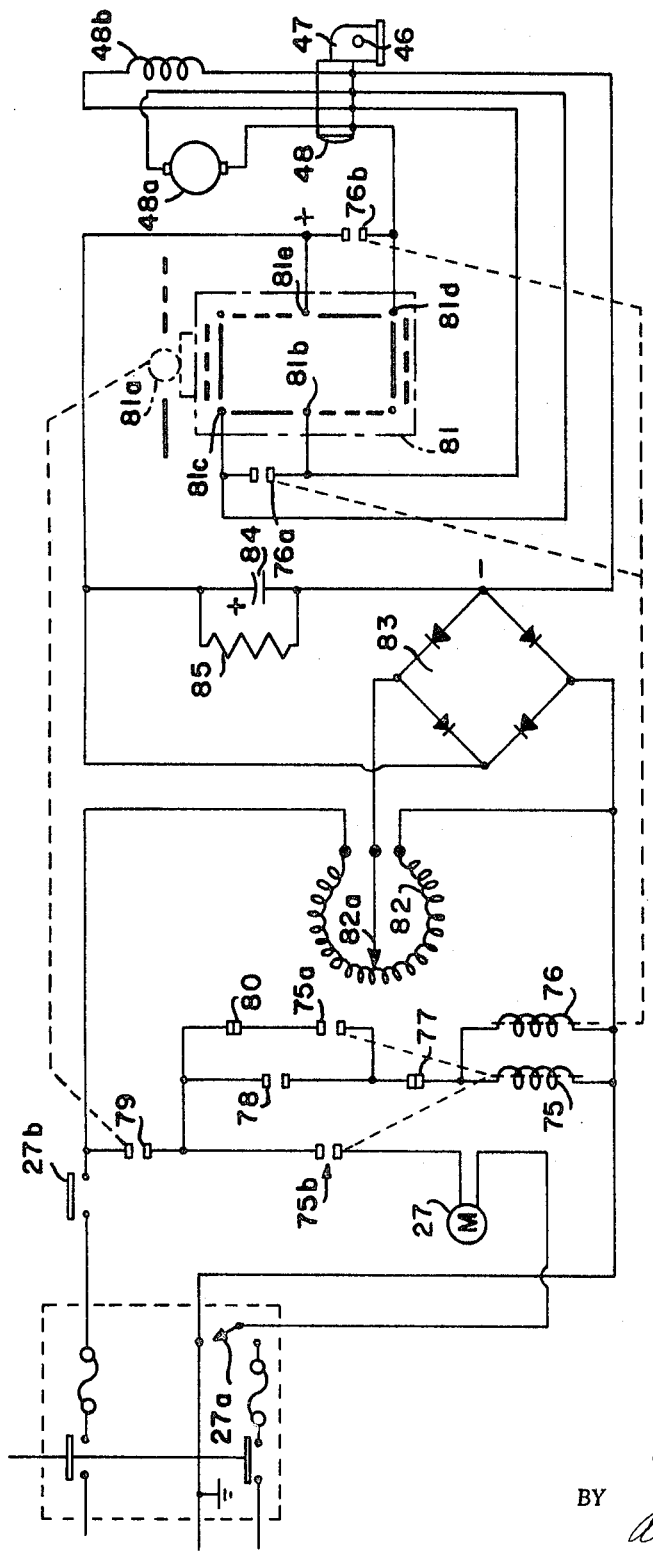
FIG. 15 is a schematic wiring diagram showing the electrical connections employed in the motor control circuit of this invention.

The saw motor 27 is of conventional alternating current type and this motor may be adapted either for 115 v. or 240 v. A.C. operation. If the motor 27 is of the 240 v. type, then switch 27a shown in FIG. 15 is connected to the lower terminal and, if it is of the 120 v. type, then switch 27a is connected to the upper terminal. Current is supplied to the motor 27 through switch 27a, toggle switch 27b, limit switch 79 and relay contacts 75b, which are controlled by the relay 75. The winding of relay 75 is connected across the 120 v. A.C. supply by pushbutton switches 77 and 78 and limit switch 79 and toggle switch 27b. Pushbutton switch 77 is normally closed, and this switch is designated as the stop switch. Thus, the saw may be stopped by manually opening switch 77. Pushbutton switch 78 is normally open, and this switch is designated as the start switch. Limit switch 79 is adapted to be closed when the manual control 81a of reversing switch 81 is at its forward position. For this purpose, an insulated mechanical connection is provided between the manual control 81a and the control of limit switch 79. Relay 75 is adapted to close contacts 75a and 75b, which are controlled thereby when the start switch 78 is closed, and when limit switch 79 is also closed, that is, when the reversing switch 81 is on its central position in which the circuits controlled thereby are open. Limit switch 80 is adapted to be open at the end of the saw cut, as previously described. Thus, when start switch 78 is closed, relays 75 and 76 are energized and saw motor 27 is turned on if limit switch 79 is closed. Relay 76 is also energized and closes contacts 76a and 76b which are associated with the reversing switch 81, as shown in the wiring diagram.

The winding of variable transformer 82 is connected across the 120 v. supply through the toggle switch 27b. This transformer is provided with a variable contact 82a which is controlled by the manually operated knob 82b, shown in FIG. 1a, which illustrates the housing 141 for the electrical controls of this apparatus. One side of the variable transformer 82 and the variable contact 82a thereof are connected across the full wave rectifier 83 which is of conventional construction and employs four diodes as shown. The filter condenser 84 and resistor 85 are connected across the D.C. output of full wave rectifier 83. The negative terminal of rectifier 83 is also connected to one side of the field winding 48b of the motor 48, and the other side of this field winding is connected to terminal 81b of the reversing switch 81 and to the lower terminal of contacts 76a of relay 76. The upper terminal of contacts 76a and terminal 81c of reversing switch 81 are connected to one side of the armature 48a of motor 48. The other side of this armature is connected to the lower terminal of contacts 76b of relay 76 and to terminal 81d of reversing switch 81. The upper terminal of relay contact 76b and terminal 81e of the reversing switch 81 are connected to the positive terminal of the full wave rectifier 83. Thus, when relay contacts 76a and 76b are closed, motor 48 is connected to rotate shaft 46 of the reduction gearing 47 in the clockwise direction. The saw carriage is then moved by the traverse chain 43 from the rear of the table to the front to cut a panel or board positioned on the table. At the end of the saw cut limit switch 80, which is normally closed, is opened by the saw support. As a result, windings of relays 75 and 76 are deenergized so that relay 75 opens contacts 75a and 75b and saw motor 27 is turned off. Relay contacts 76a and 76b are also open so that the traverse motor 48 is deenergized. The operator then moves the control lever 81a of the reversing switch 81 to reverse the connections between armature 48a and field 48b of the motor 48 and cause this motor to turn shaft 46 in counterclockwise direction whereby the traverse chain 43 is moved to return the saw to its starting position. For this purpose, the connections inside of the reversing switch are provided between terminals 81c and 81e and between terminals 81b and 81d, as shown by the broken lines.

While I have shown a preferred embodiment of the invention, it will be understood that the invention is capable of variation and modification from the form shown so that the scope thereof should be limited only by the proper scope of the claims appended thereto.

What I claim is:

1. In a traveling arbor saw, a combination comprising a frame having a table attached to the top thereof on which the work to be cut is adapted to be positioned, a circular saw blade, a motor driving said saw blade, a carriage having a platform pivotally attached thereto supporting said motor and said saw blade, rails attached to said frame, said carriage having roller means attached thereto movably supporting said carriage on said rails so that said saw blade may be moved longitudinally of said frame in alignment with a slot in said table, an auxiliary rail attached to said frame parallel to the slot in said table, said auxiliary rail having an upper surface and a lower surface, auxiliary supporting means attached to said platform engaging the upper surface of said auxiliary rail holding said platform such that said saw blade projects above said slot, and means moving said carriage on said rails during the sawing stroke and during the return stroke, said auxiliary rail having means engaged by said auxiliary supporting means for lowering said auxiliary supporting means to said lower surface at the end of the sawing stroke so that said saw blade is lowered below the top of said table during the return stroke.

2. In a traveling arbor saw, a combination as set forth in claim 1 further characterized in that said means moving said carriage on said rails comprises a flexible member having means slidably connecting it to said auxiliary supporting means.

3. In a traveling arbor saw, a combination as set forth in claim 2 further characterized in that said flexible member is driven by a reversible motor and means reversing said motor during the return stroke.

4. In a traveling arbor saw, the combination as set forth in claim 3 further characterized in that said auxiliary rail is provided with a limit switch which is normally closed and whch is adapted to be opened by said auxiliary supporting means at the end of the sawing stroke to stop said saw motor.

5. In a traveling arbor saw, the combination as set forth in claim 4, further comprising relay means connected to be energized when said saw motor is energized, said relay means having contacts controlled thereby which are connected to said reversible motor to connect said reversible motor for rotation in the clockwise direction when said saw motor is energized during the sawing stroke.

6. In a traveling arbor saw, a combination as set forth in claim 5 further characterized in that said auxiliary rail is provided with means for moving said auxiliary support from the lower surface thereof to the upper surface thereof at the end of the return stroke.

7. In a traveling arbor saw, the combination as set forth in claim 6 further comprising linking means pivotally supporting said auxiliary rail on said frame, and manually operable means comprising a member attached to said auxiliary rail for raising and lowering said auxiliary rail by swinging it on said linking means to adjust said saw blade with respect to the table surface.

8. In a traveling arbor saw, the combination as set forth in claim 7 further comprising a pair of parallel members attached to the top of said table, a fence positioned on said table, each of said parallel members having a carriage for supporting said fence therebetween, a manually rotatable rod extending between said fence supporting carriages and rotatably supported thereby, said rod having means engaging said parallel members for moving said fence to predetermined positions on said table.

References Cited

UNITED STATES PATENTS

| | | | |
|---|---|---|---|
| 1,813,783 | 7/1931 | Tomlinson | 143—47 |
| 2,536,437 | 1/1951 | Grant | 143—47 |
| 2,870,802 | 1/1959 | Richards | 143—47 |
| 3,013,592 | 12/1961 | Ambrosio et al. | 143—47 X |

HARRISON L. HINSON, Primary Examiner